June 11, 1929.  A. HAYES  1,716,775
OPTICAL PYROMETER
Filed Aug. 12, 1926
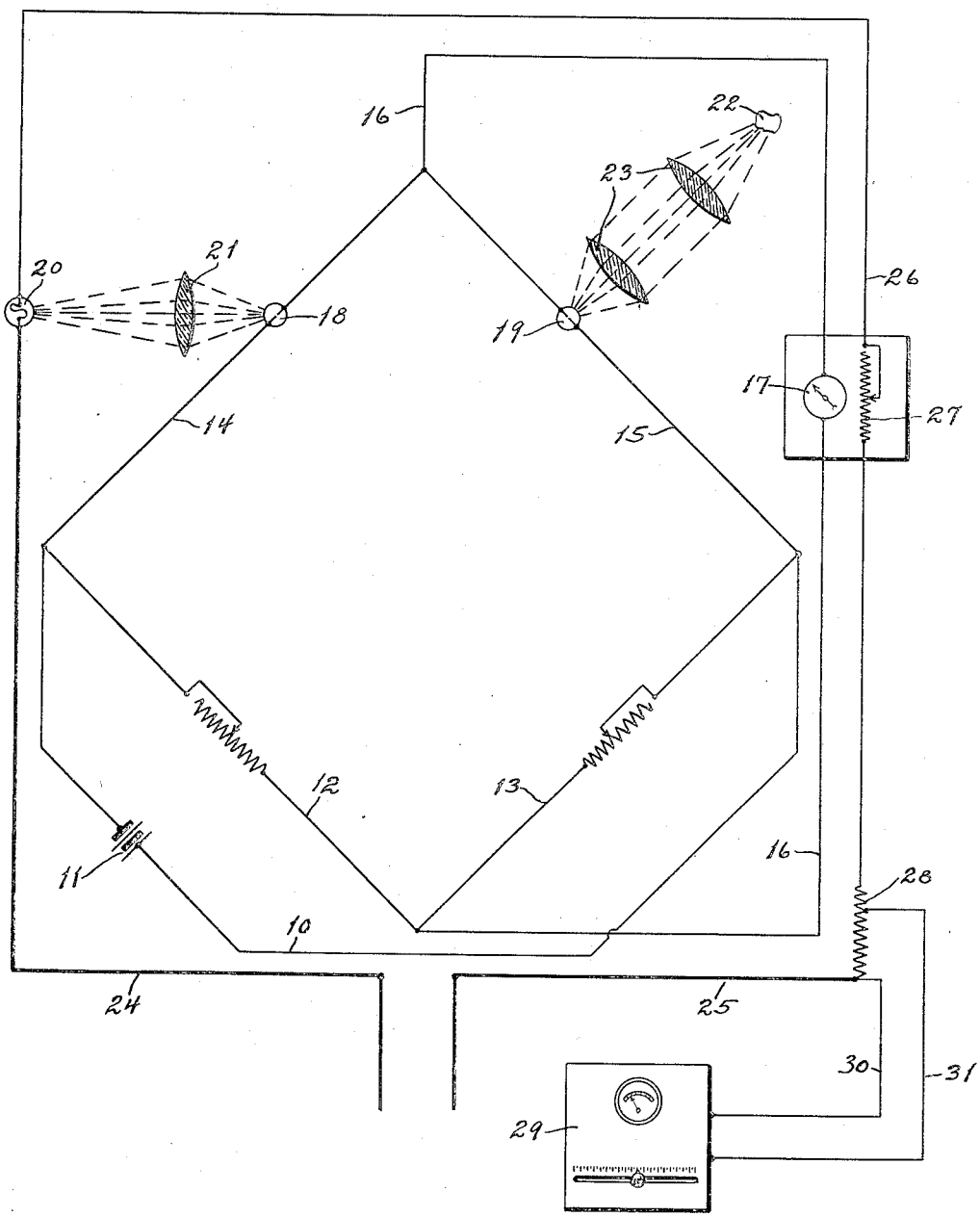
Inventor
ANSON HAYES
By  Earl M. Sinclair
Attorney Patented June 11, 1929.

1,716,775

UNITED STATES PATENT OFFICE.

ANSON HAYES, OF AMES, IOWA.

OPTICAL PYROMETER.

Application filed August 12, 1926. Serial No. 128,799.

My invention has for its object the provision of novel automatic means for measuring variations in temperature of a hot body, such as a furnace in which high temperatures are employed.

A further object is to extend the range of temperatures at which an optical pyrometer may be used, by an improved arrangement capable of measuring temperatures much lower than those visible to the eye.

More specifically, the object of this invention is to provide a new arrangement of instrumentalities including a Wheatstone bridge circuit embodying two or more photo-electric cells in two of its arms, adapted to be exposed respectively to radiation from a standard light and from the hot body whose temperature is to be measured, whereby variations of temperature of the latter will affect the resistance of its photoelectric cell or cells, together with any suitable means for determining the temperature of the hot body by measuring any suitable function of the filament current of the standard light, and any suitable means for making a record of the variations so determined.

My invention consists in the combination and arrangement of instrumentalities hereinafter set forth, pointed out in the claims and illustrated by the accompanying drawing, which is a schematic diagram illustrating the invention.

In the drawing, the numeral 10 designates a circuit wire containing a source of electrical energy such as a battery 11, and the numerals 12, 13, 14 and 15 the arms of the Wheatstone bridge, the numeral 16 indicating the bridge wire containing a galvanometer 17, or other instrument influenced by lack of balance in the Wheatstone bridge circuit. The wires 12 and 13 are or include standard resistances, while the arms 14 and 15 have as a part of their resistance units, one or more photoelectric cells 18 and 19 respectively, which may be of selenium or other suitable substance the resistance of which is affected by radiation of light or heat. The resistance of the cells 18 and 19 may be supplemented by other resistance means if desired. The cell 18 is arranged to be exposed to radiation from a standard light 20, as by means of a lens 21 and a suitable filter or filters suitably located; while the cell 19 is exposed to radiation from the furnace or other hot body whose temperature is to be measured and recorded, here designated at 22. Any suitable device, including lenses and suitable filters and here designated 23, may be employed for directing all or a desired portion of the radiation from the hot body upon the cell or cells 19.

The filament of the standard light 20 is in a circuit including the wires 24 and 25, connected with any source of E. M. F., either direct or alternating current. In series with the main circuit of the standard light is also a circuit member 26 including a rheostat 27 with any suitable Wheatstone bridge balancer or rheostat operator, which preferably is automatically operated. The main circuit also includes a standard resistance or recording milliammeter of suitable form, such as 28.

In the operation of the device, the galvanometer 17 is deflected by any change in the relative intensities of the radiation from the hot body 22 and that of the standard light 20. The galvanometer deflection is again returned to zero by changing the resistance 27 in series with the filament of the standard light 20. The changes in intensities of the radiation from the hot body and from the standard light cause corresponding changes in the resistances of the photoelectric cells 18 and 19.

The temperature of the hot body is determined by the current flowing through the filament of the standard light, or by measurement of any suitable function of this current such as the measurement of the potential drop across the standard resistance 28 in the filament circuit of the light.

The process above outlined involves the following coaction of parts: Assuming that an increase occurs in the temperature of the hot body 22, there then occurs a decrease in the resistance of the photoelectric cells 19 exposed to radiation from said hot body; this decrease causes a deflection of the galvanometer 17 which in turn requires a decrease in the resistance of the circuit of the standard light 20; the temperature of the filament of the standard light is thus increased which results in a decrease of the resistance of the photoelectric cell 18 exposed to radiation therefrom. This coaction continues until the original galvanometer deflection is reduced to zero. It is apparent then, that by measuring the change that has taken place in the current of the standard light (or any function thereof) it may be determined what change has taken place in the temperature of the hot body 22 or the radiation therefrom.

In order to make the optical pyrometer automatically recording, any suitable mechanical device may be used to maintain the balanced condition of the photoelectric cells in the Wheatstone circuit, such as the member 27, with the addition of any suitable indicating or recording mechanism, here shown conventionally and designated by the numeral 29, which member is connected with the main circuit through the wires 30 and 31. This mechanism is employed to measure and record the temperature of the hot body, to measure the current flowing through the filament of the standard light 20, or to measure and record any suitable function of this current such as the potential drop across the standard resistance 28 in the circuit of the standard light. The instrument 29 may be either an indicating or recording ammeter (in which event the resistance 28 would not be employed); and indicating or recording volt meter; or an indicating or recording potentiometer.

The current for heating the filament of the standard light 20 may be of any suitable kind, either direct or alternating, the basic feature of my improvement being the assemblage of the parts mentioned into the Wheatstone bridge arrangement, so as to make possible the use of either automatic or manually operated rheostat control or either automatic or manually operated recording and reading devices.

I claim as my invention—

1. An optical pyrometer comprising a Wheatstone bridge circuit, two arms of the bridge containing photoelectric cells, a standard light in circuit with a source of electrical energy, one of said cells arranged to receive radiations from said standard light and another arranged to receive radiations from a hot body the temperature of which is to be measured, a means in series with the circuit of the standard light for balancing the resistances of the Wheatstone bridge, and a means for measuring changes in any function of the current through said standard light.

2. An optical pyrometer comprising a Wheatstone bridge circuit, two arms of said bridge containing photoelectric cells, a standard light in circuit with a source of electrical energy, one of said cells arranged to receive radiations from said standard light and another arranged to receive radiations from a hot body the temperature of which is to be measured, together with means for changing the resistance of the circuit of the standard light, and means for measuring the potential drop in the circuit of said standard light.

3. An optical pyrometer comprising a Wheatstone bridge circuit, two arms of said bridge containing photoelectric cells, a standard light in circuit with a source of electrical energy, the cell or cells of one of said arms being exposed to radiations from said standard light and those of the other exposed to radiations from a hot body whose temperature is to be measured, a means for changing the resistance of the circuit of said standard light, and a means for measuring a function of the current flowing through the circuit of the filament of said standard light.

4. An optical pyrometer comprising a Wheatstone bridge circuit, two arms of said bridge containing photoelectric cells, a standard light in circuit with a source of electrical energy, the cells of one of said arms arranged to receive radiations from said standard light and those of the other arranged to receive radiations from a hot body whose temperature is to be measured, a means for changing the resistance of the circuit of said standard light, a standard resistance in the circuit of the standard light, and a means for measuring the potential drop across said standard resistance.

5. An optical pyrometer comprising a Wheatstone bridge circuit, two arms of said bridge containing photoelectric cells, a standard light in circuit with a source of electrical energy, one of said cells arranged to receive radiations from said standard light and another arranged to receive radiations from a hot body whose temperature is to be measured, whereby changes in intensity of radiation from the hot body and from the standard light cause changes in the resistances of the photoelectric cells of the respective arms of the bridge, a means of changing the resistance of the circuit of the standard light to balance the Wheatstone bridge, a standard resistance in the circuit of the standard light, and a means for measuring the potential drop across said standard resistance.

ANSON HAYES.